Jan. 8, 1952  K. TOLLE  2,582,085
WIDE-ANGLE LENS ATTACHMENT WITH FRONT
ELEMENT OF HIGH INDEX GLASS
Filed Sept. 1, 1950  2 SHEETS—SHEET 1

Fig. 1

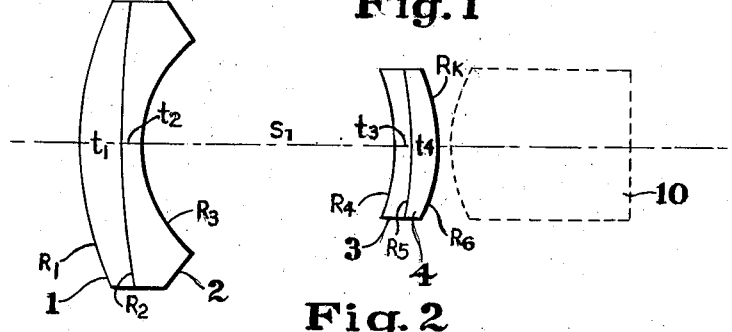

Fig. 2

| EXAMPLE 1 | | | | MAGN. .784 |
|---|---|---|---|---|
| F NEG. = 78.4 mm. | | | | F POS. = 100 mm. |
| LENS | N | V | RADII | THICKNESSES |
| 1 | 1.880 | 41.1 | $R_1 = +27.24$ mm | $t_1 = 3.43$ mm |
| 2 | 1.529 | 51.6 | $R_2 = +338.0$ | $t_2 = 1.44$ |
|   |       |      | $R_3 = +10.93$ | $S_1 = 20.28$ |
| 3 | 1.575 | 41.4 | $R_4 = -16.70$ | $t_3 = 0.95$ |
| 4 | 1.572 | 57.4 | $R_5 = -85.53$ | $t_4 = 2.17$ |
|   |       |      | $R_6 = -13.77$ |              |

Fig. 4

| EXAMPLE 2 | | | | MAGN. .787 |
|---|---|---|---|---|
| F NEG. = 78.7 mm. | | | | F POS. = 100 mm. |
| LENS | N | V | RADII | THICKNESSES |
| 1 | 1.804 | 41.8 | $R_1 = +29.39$ mm | $t_1 = 2.68$ mm |
| 2 | 1.526 | 54.6 | $R_2 = +138.15$ | $t_2 = 2.23$ |
|   |       |      | $R_3 = +12.74$ | $S_1 = 21.60$ |
| 3 | 1.517 | 64.5 | $R_4 = -23.97$ | $t_3 = 2.96$ |
|   |       |      | $R_5 = -17.18$ |              |

Fig. 3

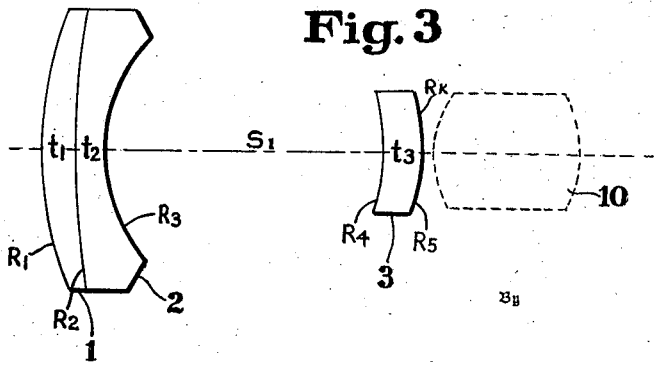

*Karl Tolle*
Inventor

Daniel J. Mayne
Harold F. Bennett
Atty. & Agt.

Fig. 5
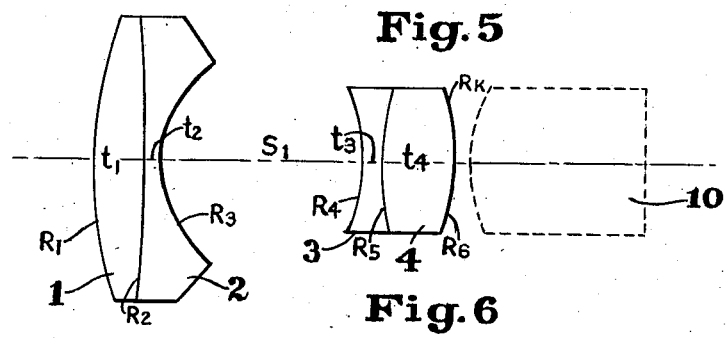
Fig. 6
| EXAMPLE 3 | | | MAGN. .624 |
|---|---|---|---|
| F NEG.= 62.4 mm. | | | F POS.= 100mm. |
| LENS | N | V | RADII | THICKNESSES |
| 1 | 1.880 | 41.1 | $R_1 = +50.06$ mm | $t_1 = 5.39$ mm. |
| 2 | 1.500 | 61.6 | $R_2 = -145.8$ | $t_2 = 1.82$ |
| | | | $R_3 = +12.82$ | $S_1 = 22.65$ |
| 3 | 1.575 | 41.4 | $R_4 = -25.64$ | $t_3 = 2.76$ |
| 4 | 1.572 | 57.4 | $R_5 = +38.63$ | $t_4 = 8.13$ |
| | | | $R_6 = -20.35$ | |
Fig. 8
| EXAMPLE 7 | | | MAGN. .624 |
|---|---|---|---|
| F NEG.= 62.4 mm. | | | F POS.= 100mm. |
| LENS | N | V | RADII | THICKNESSES |
| 1 | 1.880 | 41.1 | $R_1 = +50.06$ mm | $t_1 = 5.39$ mm |
| 2 | 1.500 | 61.6 | $R_2 = -145.8$ | $t_2 = 1.82$ |
| | | | $R_3 = +12.82$ | $S_1 = 27.57$ |
| 3 | 1.804 | 41.8 | $R_4 = -63.26$ | $t_3 = 1.29$ |
| | | | $R_5 = +32.19$ | $S_2 = 1.73$ |
| 4 | 1.523 | 58.6 | $R_6 = +34.14$ | $t_4 = 3.06$ |
| | | | $R_7 = -18.57$ | |
Fig. 7
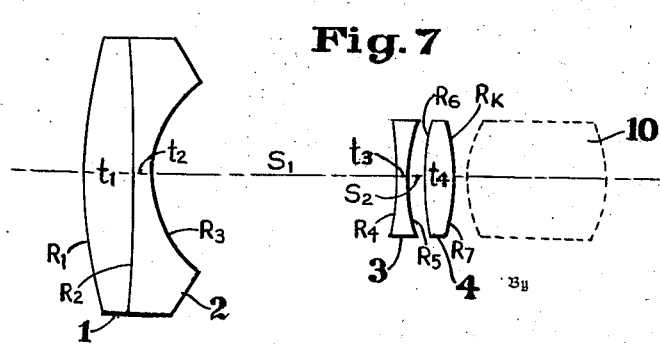
*Karl Tolle*
Inventor Patented Jan. 8, 1952

2,582,085

UNITED STATES PATENT OFFICE 2,582,085

WIDE-ANGLE LENS ATTACHMENT WITH FRONT ELEMENT OF HIGH INDEX GLASS

Karl Tolle, Rochester, N. Y., assignor to Eastman Kodak Company, Rochester, N. Y., a corporation of New Jersey Application September 1, 1950, Serial No. 182,699

5 Claims. (Cl. 88—57)

This invention relates to wide-angle attachments for photographic objectives.

The object of the invention is to provide a substantially afocal wide-angle attachment which is more highly corrected for distortion and field curvature than heretofore available and which is highly corrected for spherical aberration and coma, and especially adapted for use with high-aperture objectives around f/1.4.

It is well known to place a reversed Galilean telescope in front of a photographic objective to cover a wider object field than the objective alone is capable of covering. By "reversed" is meant a telescopic system having its negative member in front, i. e. facing the distant object, and its positive member behind and adjacent the objective. Such an attachment has a magnification less than unity and usually between 0.25 and 0.9. That is, the equivalent focal length of the combination is between 0.25 and 0.9 times the equivalent focal length of the objective alone. Such telescopic attachments are usually afocal, that is the distance from the rear principal point of the front member to the front principal point of the rear member is equal to the numerical difference between the focal lengths of the two members, so that very distant objects are focused at the same distance behind the objective whether or not the attachment is used. It may be preferred in some conditions of use, however, to adjust the members slightly away from the afocal spacing for focusing and in particular to adjust them so that the image distance corresponding to some nearer object remains unchanged when the attachment is added to or removed from the objective, but the attachment is still approximately afocal.

In known afocal wide-angle attachments the negative member is usually meniscus in shape and convex to the front, but there is considerably more variety in the shapes of the positive member.

According to the present invention, a substantially afocal wide-angle attachment for photographic objectives is made up in which the two members are concave toward each other, the negative member consists of a front positive element and a rear negative element cemented thereto, the refractive index of the front positive element is between 1.75 and 2.0, and the difference between the index of the front element and that of the second element is between 0.23 and 0.50. The curvatures of the three surfaces of the front member depend somewhat upon the magnification and are preferably within the limits set forth by the following algebraic inequalities:

$$6M - 1.8 < F_{II}/R_1 < 6M$$
$$8M - 6.4 < F_{II}/R_2 < 8M - 4.8$$
$$3M + 5.0 < F_{II}/R_3 < 3M + 7.2$$

where M is the magnification of the attachment, $F_{II}$ is the focal length of the positive member,
and $R_1$, $R_2$ and $R_3$ are the radii of curvature of the three surfaces of the front member in order from front to rear. For example, when the magnification is 0.5, $F_{II}/R_1$ is between $+1.2$ and $+3.0$, $F_{II}/R_2$ is between $-2.4$ and $-0.8$, and $F_{II}/R_3$ is between $+6.5$ and $+8.7$, and when the magnification is 0.8 the corresponding ranges are $+3.0$ to $+4.8$, zero to $+1.6$ and $+7.4$ to $+9.6$ respectively. Positive and negative values of curvature indicate surfaces respectively convex and concave to the front, and a zero value indicates a plane surface.

The curvature of the cemented surface is chosen to correct the distortion and corresponds closely to curvatures known in the prior art. A large index difference at this surface, however, corrects the distortion to a higher degree than heretofore and with less zonal distortion. The front and rear surfaces of the negative member are more strongly curved than is customary, and I find that these strong curvatures in conjunction with the high index difference just mentioned are advantageous in correcting the curvature of field. It is more usual for weaker curves to be associated with higher refractive indices, and it is surprising to find that stronger curves give better results in this case.

As in the prior art, there is greater variety in structure and shape of the positive member than in that of the negative member. I have found it advantageous to make the positive member meniscus in outward form, that is concave toward the front and convex toward the rear, and preferably the curvature $1/R_k$ of the rear surface is such that $F_{II}/R_k$ is numerically between $(5M+1)$ and $(5M+4)$. The positive member may satisfactorily be made of a simple positive element of low dispersion glass when the magnification is between 0.9 and about 0.7 or even 0.6 if the requirements of lateral color correction are not too critical. An achromatic doublet is preferable if the color is to be highly corrected. For practical reasons, the doublet is preferably cemented but may be made up with a small airspace. An airspaced doublet provides an additional tool for the designer to correct coma more easily, but is generally considered more expensive to make than the cemented doublet.

The refractive indices of the glass or glasses making up the positive member may be varied considerably without having a very great effect on the spherical aberration, coma, distortion or curvature of field. Accordingly they are chosen so as to control the Petzval sum to some degree and thereby to control the astigmatism. The stronger attachments, that is those whose magnification is smaller and which accordingly change the focal length more, tend to have a more negative Petzval sum, and likewise the Petzval sum tends to be more negative if an attachment is redesigned in a more compact form, that is if the focal lengths of the two members are individually decreased while being maintained in the same ratio to each other. This tendency toward a negative Petzval sum can be counteracted to a large degree by making up the positive member of one or more high-index negative elements and one or more low-index positive elements. Known glasses suitable for use in the positive member range from about 1.37 to about 2.0 in refractive index.

Moreover, these indices may be chosen to give the best results with a particular objective. In moderate aperture systems such as f/4.5 an attachment can be universal, that is it can be made to work satisfactorily on nearly all well designed f/4.5 objectives, but in extremely high aperture systems such as f/1.5 or f/1.4 the depth of focus is much less and it is often advisable to design an attachment to give the best results with a particular objective and to modify the design for use with a different objective.

The curvature of the front surface of the rear member varies greatly with the indices of the glasses of which this member is made up, but it is preferably concave. When the refractive index is substantially uniform throughout this member, this curvature is preferably numerically between $(5M-0.4)$ and $(5M+3)$, and when the average index of the negative element or elements exceeds that of the positive element or elements by $\Delta N$ it is preferably between $(5M-0.4+8\Delta N)$ and $(5M+3+8\Delta N)$. The curvatures of the interior surfaces of this component, if any, are determined by the requirements of color correction.

In the accompanying drawings:

Figs. 1 and 2 show an afocal attachment according to the invention and data for a specific example thereof;

Figs. 3 and 4 show a simpler form of the invention and data for a specific example thereof;

Figs. 5 and 6 show a slightly different form of the invention and data for a specific example thereof;

Figs. 7 and 8 show a further variation of the invention and data for a specific example thereof.

In each of Figs. 1, 3, 5 and 7, an axial diagram of the wide-angle attachment is shown in full lines, and the objective 10 that it is attached in front of is represented in outline by a broken line.

The tables of data given in Figs. 2, 4, 6 and 8 are repeated below for convenience, and along with them additional examples are given. In each table the lens elements are numbered in the first column in order from front to rear, the second and third columns give the corresponding refractive indices N for the D line of the spectrum and the dispersive indices V. The last two columns give the radii of curvature R of the lens surfaces, the thicknesses $t$ of the lens elements and the axial distances $s$ between components, each numbered by subscripts in order from front to rear. The $+$ and $-$ values of the radii denote surfaces respectively convex and concave to the front. Also $F_{NEG}$ and $F_{POS}$ denote the focal lengths of the negative and the positive members, respectively. All the examples are given on a scale according to which the focal length $F_{POS}$ of the positive member is 100 mm. The magnification is then 0.01 times the focal length $F_{NEG}$ of the negative member.

Example 1, shown in Figs. 1 and 2, consists of two cemented doublets, each consisting of two meniscus elements. That is, in this case, the two cemented surfaces are concave toward each other. The specifications for this example are as follows:

Example 1, Figs. 1 and 2

$F_{NEG}=78.4$ mm. $F_{POS}=100.0$ mm.

| Lens | N | V | Radii | Thicknesses |
|---|---|---|---|---|
| 1 | 1.880 | 41.1 | $R_1=+27.24$ mm. | $t_1=3.43$ mm. |
| 2 | 1.529 | 51.6 | $R_2=+338.0$ | $t_2=1.44$ |
|   |       |      | $R_3=+10.93$ | $s_1=20.28$ |
| 3 | 1.575 | 41.4 | $R_4=-16.70$ | $t_3=0.95$ |
| 4 | 1.572 | 57.4 | $R_5=-85.53$ | $t_4=2.17$ |
|   |       |      | $R_6=-13.77$ |             |

Figs. 3 and 4 show a simplified form of the invention in which the positive member consists of a simple meniscus element. This attachment was designed for use under conditions which do not require such a high degree of correction of color, but still the color aberrations are not very large. This example has the following specifications:

Example 2, Figs. 3 and 4

$F_{NEG}=78.7$ mm. $F_{POS}=100.0$ mm.

| Lens | N | V | Radii | Thicknesses |
|---|---|---|---|---|
| 1 | 1.804 | 41.8 | $R_1=+29.39$ mm. | $t_1=2.68$ mm. |
| 2 | 1.526 | 54.6 | $R_2=+138.15$ | $t_2=2.23$ |
|   |       |      | $R_3=+12.74$ | $s_1=21.60$ |
| 3 | 1.517 | 64.5 | $R_4=-23.97$ | $t_3=2.96$ |
|   |       |      | $R_5=-17.18$ |             |

Example 3, shown in Figs. 5 and 6, has a somewhat stronger wide-angle effect, that is a lower magnification, and the cemented surface in the front component is concave to the front in accordance with the invention when applied to stronger attachments. The cemented surface of the rear member is also curved in the opposite direction from that shown in Example 1, but I do not consider this to be an essential feature of the invention. This is a "buried surface," that is, the refractive index is substantially the same on both sides, so that its curvature can be varied during the design of a system for correcting color in known manner and without disturbing the other corrections. The data for this example is as follows:

Example 3, Figs. 5 and 6

$F_{NEG}=62.4$ mm. $F_{POS}=100.0$ mm.

| Lens | N | V | Radii | Thicknesses |
|---|---|---|---|---|
| 1 | 1.880 | 41.1 | $R_1=+50.06$ mm. | $t_1=5.39$ mm. |
| 2 | 1.500 | 61.6 | $R_2=-145.8$ | $t_2=1.82$ |
|   |       |      | $R_3=+12.82$ | $s_1=22.65$ |
| 3 | 1.575 | 41.4 | $R_4=-25.64$ | $t_3=2.76$ |
| 4 | 1.572 | 57.4 | $R_5=+38.63$ | $t_4=8.13$ |
|   |       |      | $R_6=-20.35$ |             |

Examples 4 and 5 are similar to Example 3 but use different types of glass in the two front elements, and the magnification is somewhat different in Example 5. Their specifications are as follows:

Example 4, Fig. 5

$F_{NEG}=62.4$ mm. $F_{POS}=100.0$ mm.

| Lens | N | V | Radii | Thicknesses |
|---|---|---|---|---|
| 1 | 1.804 | 41.8 | $R_1=+49.26$ mm. | $t_1=5.42$ mm. |
| 2 | 1.511 | 63.5 | $R_2=-147.4$ | $t_2=3.09$ |
|   |       |      | $R_3=+13.65$ | $s_1=24.83$ |
| 3 | 1.575 | 41.4 | $R_4=-28.09$ | $t_3=3.39$ |
| 4 | 1.572 | 57.4 | $R_5=+40.95$ | $t_4=7.17$ |
|   |       |      | $R_6=-21.32$ |             |

Example 5, Fig. 5

$F_{NEG}$=71.4 mm.    $F_{POS}$=100.0 mm.

| Lens | N | V | Radii | Thicknesses |
|---|---|---|---|---|
| 1 | 1.804 | 41.8 | $R_1$= +35.44 mm. | $t_1$= 4.57 mm. |
| 2 | 1.523 | 58.6 | $R_2$= −376.8 | $t_2$= 2.23 |
|  |  |  | $R_3$= +12.70 | $s_1$=22.71 |
| 3 | 1.575 | 41.4 | $R_4$= −22.53 | $t_3$= 1.56 |
| 4 | 1.525 | 57.4 | $R_5$= +80.42 | $t_4$= 4.47 |
|  |  |  | $R_6$= −17.68 |  |

Example 6 differs but little from Example 3 in respect to the radii of curvature and is made up of the same kinds of glass. It is included to illustrate the invention embodied in an attachment designed to be mounted at a greater distance from the standard camera objective. All the other examples are intended to be mounted with their respective rear surfaces within 3 mm. of the front surface of the standard objective, but Example 6 was designed to be mounted 20 mm. in front of the objective when the shape of the standard lens mount prevents the mounting of the attachment closer than this. The cemented surface in the front doublet has a weaker curvature, that is it is varied in the plus direction, to restore the distortion, lateral color, and curvature of field corrections after this change. Otherwise it is very similar to Example 3. The specifications are as follows:

Example 6, Fig. 5

$F_{NEG}$=62.6 mm.    $F_{POS}$=100.0 mm.

| Lens | N | V | Radii | Thicknesses |
|---|---|---|---|---|
| 1 | 1.880 | 41.1 | $R_1$= +50.86 mm. | $t_1$= 5.46 mm. |
| 2 | 1.500 | 61.6 | $R_2$= −136.4 | $t_2$= 1.92 |
|  |  |  | $R_3$= +12.86 | $s_1$=22.50 |
| 3 | 1.575 | 41.4 | $R_4$= −25.59 | $t_3$= 2.74 |
| 4 | 1.572 | 57.4 | $R_5$= +38.62 | $t_4$= 8.26 |
|  |  |  | $R_6$= −20.37 |  |

Example 7, shown in Figs. 7 and 8, is a modification of Example 3. Example 3 is particularly designed to work with objectives having slightly inward curving field, whereas Example 7 is specifically intended for objectives having a perfectly flat field. One way in which the field might be corrected would involve changing $R_1$ and $R_3$ but this would introduce astigmatism. Instead, in Example 7, the glass in lens 3 is replaced by a glass of higher index to change the Petzval sum in the plus direction. For economy, the same identical front doublet is used in both designs, and under this restriction a small airspace is introduced in the rear doublet to correct both coma and spherical aberration simultaneously. Due to the high index difference there is considerable negative power in the internal pair of surfaces, so that the front surface $R_4$ needs less negative power to maintain the focal length of this component. Also due to the higher index of lens 3, this front surface $R_4$ needs less curvature for any selected power, hence the curvature of this surface is much weaker than in the other examples by about $8\Delta N/F_{II}$, where $\Delta N$ is the index difference and $F_{II}$ is the focal length of the positive member. The specifications for this example are as follows:

Example 7, Figs. 7 and 8

$F_{NEG}$=62.4 mm.    $F_{POS}$=100.0 mm.

| Lens | N | V | Radii | Thicknesses |
|---|---|---|---|---|
| 1 | 1.880 | 41.1 | $R_1$= +50.06 mm. | $t_1$= 5.39 mm. |
| 2 | 1.500 | 61.6 | $R_2$= −145.8 | $t_2$= 1.82 |
|  |  |  | $R_3$= +12.82 | $s_1$=27.57 |
| 3 | 1.804 | 41.8 | $R_4$= −63.26 | $t_3$= 1.29 |
|  |  |  | $R_5$= +32.19 | $s_2$= 1.73 |
| 4 | 1.523 | 58.6 | $R_6$= +34.14 | $t_4$= 3.06 |
|  |  |  | $R_7$= −18.57 |  |

Examples 1, 2, 3, 4 and 7 were originally designed for use in combination with 25 mm. objectives and have been made up with the focal lengths of the positive members ranging from 112 mm. in Example 4 to 169 mm. in Example 2. Examples 5 and 6 were originally designed for use in front of 13 mm. objectives and with the focal lengths of the positive members 67 mm. and 79 mm. respectively.

In accordance with the invention, $$(6M - F_{II}/R_1)$$

is algebraically between zero and +1.8, $$(8M - F_{II}/R_2)$$

is between +4.8 and +6.4, $(3M - F_{II}/R_3)$ is between −5.0 and −7.2, and the front and back surfaces of the positive member are concave toward the front. Also in accordance with a preferred feature of the invention, $(5M + F_{II}/R_k)$ is algebraically between −1 and −4 in each example, where $R_k$ is the radius of curvature of the rear surface of the positive member. With this radius in the preferred range, the curvature $1/R_4$ of the front surface of the positive member is largely determined by the refractive indices used in the positive member and by the focal length $F_{II}$ assigned thereto. In each of the above examples this curvature is such that $(5M - 8\Delta N + F_{II}/R_4)$ is between −3 and +0.4, where $\Delta N$ is equal to zero when the positive member consists of a single element and is equal to the difference $(N_3 - N_4)$ between the refractive index $N_3$ of the negative element of the positive member and the refractive index $N_4$ of the positive element of the positive member when the positive member is a substantially achromatic doublet. The value of $\Delta N$ can be negative, but it is more usually positive.

The numerical values of these several quantities are summarized in the following table:

| Example No | 1 | 2 | 3 | 4 | 5 | 6 | 7 |
|---|---|---|---|---|---|---|---|
| Magnification M | .784 | .787 | .624 | .624 | .714 | .626 | .624 |
| $F_{II}/R_1$ | +3.67 | +3.40 | +2.00 | +2.03 | +2.82 | +1.97 | +2.00 |
| $F_{II}/R_2$ | +0.30 | +0.72 | −0.69 | −0.68 | −0.27 | −0.73 | −0.69 |
| $F_{II}/R_3$ | +9.15 | +7.85 | +7.80 | +7.33 | +7.87 | +7.78 | +7.80 |
| $F_{II}/R_4$ | −5.99 | −4.17 | −3.90 | −3.56 | −4.44 | −3.91 | −1.58 |
| $F_{II}/R_k$ | −7.26 | −5.82 | −4.91 | −4.69 | −5.66 | −4.91 | −5.39 |
| $\Delta N$ | .003 | .000 | .003 | .003 | .003 | .003 | .281 |
| $F_{II}/R_1 - 6M$ | −1.03 | −1.32 | −1.74 | −1.71 | −1.46 | −1.79 | −1.74 |
| $F_{II}/R_2 - 8M$ | −5.97 | −5.58 | −5.68 | −5.67 | −5.98 | −5.74 | −5.68 |
| $F_{II}/R_3 - 3M$ | +6.80 | +5.49 | +4.93 | +5.46 | +5.73 | +5.90 | +5.93 |
| $F_{II}/R_4 + 5M - 8\Delta N$ | −2.09 | −0.24 | −0.80 | −0.46 | −0.89 | −0.80 | −0.71 |
| $F_{II}/R_k + 5M$ | −3.34 | −1.89 | −1.79 | −1.57 | −2.09 | −1.78 | −2.27 |

In every case in which the positive member is made up of two elements, the curvature of the pair of internal surfaces (usually cemented together), as determined by the requirements of color correction, is such that $F_{II}$ times this curvature is between −1.6 and +3.5. As is more or less customary, the effective curvature of a pair of internal surfaces separated by a small air space is considered to be the arithmetic mean of the curvatures of the two surfaces.

Wide-angle attachments according to the invention have been made up and proven to be very satisfactory in use. It is contemplated that the invention will be most useful in attachments having magnifications between 0.9 and about 0.45.

The focal lengths given above for Examples 2 to 5 inclusive are computed for the actinic rays (the $g$ or $G'$ wavelength) and those given for Examples 1, 6 and 7 are computed for the visual rays (the D wavelength). The disparities, if any, are only a fraction of one percent, however.

I claim:

1. A wide-angle attachment for use on the front of a photographic objective comprising a meniscus negative member axially aligned with and approximately afocally spaced in front of a positive member which is meniscus in outward form and concave toward the front, in which the negative member consists of a front positive element and a negative element cemented to the rear thereof, in which the refractive index of the positive element is between 1.75 and 2.0 and the refractive index of the negative element is less than that of the positive element by between 0.23 and 0.50, and in which the radii of curvature $R_1$, $R_2$, $R_3$ of the three optical surfaces of the negative member in order from front to rear are such that $(6M - F_{II}/R_1)$ is between zero and +1.8, $(8M - F_{II}/R_2)$ is between 4.8 and 6.4, and $(3M - F_{II}/R_3)$ is between −5.0 and −7.2, wherein $F_{II}$ is the focal length of the positive member, $M$ is the magnification of the attachment and is between 0.45 and 0.9 and where a radius of curvature has a positive value when the surface is convex to the front and a negative value when the surface is concave to the front.

2. A wide-angle attachment according to claim 1 in which the radius of curvature $R_k$ of the rear surface of the positive member is negative and is such that $(5M + F_{II}/R_k)$ is between −1 and −4.

3. A wide-angle attachment according to claim 2 in which the positive member consists of a negative element and a positive element in which the radius of curvature $R_4$ of the front surface of the positive member is negative and is such that $(5M - 8N_3 + 8N_4 + F_{II}/R_4)$ is between −3 and +0.4, where $N_3$ and $N_4$ are respectively the refractive indices of the negative and positive elements of the positive member.

4. A wide-angle attachment for use on the front of a photographic objective comprising a meniscus negative member axially aligned with and approximately afocally spaced in front of a positive member which is meniscus in outward form and concave toward the front, in which the negative member consists of a front positive element and a negative element cemented to the rear thereof, and in which the radii of curvature $R_1$, $R_2$, $R_3$ of the three optical surfaces of the negative member in order from front to rear, the radii of curvature $R_4$ and $R_k$ of the front and rear surfaces of the positive member, and the air-space $S$ between the members are within the limits set forth in the following table of algebraic inequalities:

$$0.27 F_{POS} < +R_1 < 0.51 F_{POS}$$
$$1.3 F_{POS} < \pm R_2$$
$$0.10 F_{POS} < +R_3 < 0.14 F_{POS}$$
$$0.16 F_{POS} < -R_4 < 0.64 F_{POS}$$
$$0.13 F_{POS} < -R_k < 0.22 F_{POS}$$
$$0.20 F_{POS} < S < 0.28 F_{POS}$$

where $F_{POS}$ is the focal length of the positive member, where + and − values of R denote surfaces respectively convex and concave to the front, and where an infinitely large value of either sign denotes a plane surface.

5. An approximately afocal wide-angle attachment for use on the front of a photographic objective which consists of a front negative cemented doublet and a rear positive cemented doublet coaxially spaced therefrom and which has substantially the specifications set forth in the following table:

| Lens | N | V | Radii | Thicknesses |
|---|---|---|---|---|
| 1 | 1.88 | 41 | $R_1 = +0.5 F_{II}$ | $t_1 = 0.05 F_{II}$ |
| 2 | 1.50 | 61 | $R_2 = -1.5 F_{II}$ | $t_2 = 0.02 F_{II}$ |
|   |      |    | $R_3 = +0.13 F_{II}$ | $s = 0.23 F_{II}$ |
| 3 | 1.58 | 41 | $R_4 = -0.3 F_{II}$ | $t_3 = 0.03 F_{II}$ |
| 4 | 1.57 | 57 | $R_5 = +0.4 F_{II}$ | $t_4 = 0.08 F_{II}$ |
|   |      |    | $R_6 = -0.2 F_{II}$ | $F_I = -0.62 F_{II}$ | where the lens elements are numbered in order from front to rear in the first column, the corresponding refractive indices N for the D line of the spectrum and the dispersive indices V are given in the second and third column, and the radii of curvature R of the lens surfaces and the thicknesses $t$ of the lens elements, each numbered by subscripts in order from front to rear are given in the third and fourth columns along with the space $s$ between the doublets and the focal length $F_I$ of the negative doublet, and where $F_{II}$ is the focal length of the positive doublet and the + and − values of the radii denote surfaces respectively convex and concave toward the front.

KARL TOLLE.

REFERENCES CITED

The following references are of record in the file of this patent:

UNITED STATES PATENTS

| Number | Name | Date |
|---|---|---|
| 1,651,493 | Warmisham | Dec. 6, 1927 |
| 2,184,018 | Ort | Dec. 19, 1939 |
| 2,324,057 | Bennett | July 13, 1943 |

FOREIGN PATENTS

| Number | Country | Date |
|---|---|---|
| 605,884 | France | Feb. 26, 1926 |
| 722,817 | France | Jan. 5, 1932 |